(12) United States Patent
Singhal et al.

(10) Patent No.: US 9,807,552 B1
(45) Date of Patent: Oct. 31, 2017

(54) SYSTEM, METHOD, AND COMPUTER PROGRAM FOR INTELLIGENT RADIO STATE SWITCHING FOR GEOGRAPHICALLY FIXED ACCESS POINTS

(71) Applicant: Amdocs Development Limited, Limassol (CY)

(72) Inventors: Love Kumar Singhal, Delhi (IN); Sanjay Bhatia, Pune (IN)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/194,448

(22) Filed: Jun. 27, 2016

Related U.S. Application Data (60) Provisional application No. 62/184,713, filed on Jun. 25, 2015.

(51) Int. Cl.
*H04W 4/02* (2009.01)
*H04W 52/02* (2009.01)
*H04W 8/22* (2009.01)

(52) U.S. Cl.
CPC ............... *H04W 4/02* (2013.01); *H04W 8/22* (2013.01)

(58) Field of Classification Search
CPC ..... H04W 52/00–52/0296; H04W 4/02–4/025
USPC ...... 455/456.1–457, 13.4, 522, 127.1, 127.4, 455/127.5
See application file for complete search history.

(56) References Cited

U.S. PATENT DOCUMENTS

| 8,023,522 | B2 | 9/2011 | Gobriel et al. | |
|---|---|---|---|---|
| 2004/0203789 | A1* | 10/2004 | Hammond | H04W 36/32 455/440 |
| 2006/0063560 | A1 | 3/2006 | Herle | |
| 2010/0234017 | A1* | 9/2010 | Lim | H04L 12/2807 455/426.1 |
| 2011/0222523 | A1* | 9/2011 | Fu | H04W 36/22 370/338 |
| 2013/0065517 | A1* | 3/2013 | Svensson | H04W 12/00 455/39 |

FOREIGN PATENT DOCUMENTS

EP 2557859 A1 2/2013

OTHER PUBLICATIONS

"Google Nexus 5—WIFI Battery drain on standby," ANDROIDPIT, Android Forum, 2014, pp. 1-2, retrieved from www.androidpit.com/forum/587395/google-nexus-5-wifi-battery-drain-on-standby.

(Continued)

*Primary Examiner* — Allahyar Kasraian
(74) *Attorney, Agent, or Firm* — Zilka-Kotab, PC (57) ABSTRACT

A system, method, and computer program product are provided for intelligent radio state switching for geographically fixed access points. In use, a location associated with a mobile device is determined, using minimal energy drain on a battery of the mobile device. Additionally, it is determined whether the location is associated with a known desired geographical area for accessing at least one communication network. Further, at least one transceiver of the mobile device is turned on for accessing the at least one communication network when it is determined that the location is associated with the known desired geographical area.

17 Claims, 6 Drawing Sheets

(56) References Cited

OTHER PUBLICATIONS

"Does your battery drain fast on Wifi?" Android Central Forums, 2013, pp. 1-5, retrieved from http://forums.androidcentral.com/htc-one/299520-does-your-battery-drain-fast-wifi.html.

Angove, A., "Disable WiFi scanning to extend battery life, for Android," Jul. 21, 2014, pp. 1-7, retrieved from www.whistleout.com.au/MobilePhones/Guides/Disable-WiFi-scanning-to-extend-battery-life-for-Android.

Smith, C., "iOS 8 is already causing Wi-Fi and battery drain issues," Sep. 23, 2014, pp. 1-5, retrieved from http://bgr.com/2014/09/23/ios-8-witi-and-battery-drain-issues/.

"Does having wifi always on drain your battery more?," MacRumors Forum, 2011, pp. 1-12, retrieved from http://forums.macrumors.com/showthread.php?t=1396891.

Sun, L. et al., "Modeling WiFi Active Power/Energy Consumption in Smartphones," Distributed Computing Systems (ICDCS), 2014 IEEE 34th International Conference on, Madrid, 2014, pp. 41-51.

* cited by examiner

SYSTEM, METHOD, AND COMPUTER PROGRAM FOR INTELLIGENT RADIO STATE SWITCHING FOR GEOGRAPHICALLY FIXED ACCESS POINTS

CLAIM OF PRIORITY

This application claims the benefit of U.S. Provisional Application No. 62/184,713, filed Jun. 25, 2015, the entire contents of which are incorporated herein by reference.

FIELD OF THE INVENTION

The present invention relates to communication networks, and more particularly to efficiently accessing such communication networks.

BACKGROUND

Mobile devices often use multiple radio access technologies. For example, such technologies include Wi-Fi, Bluetooth, Wi-Fi Direct, and USB Wireless, etc. In addition, the technologies may include cellular technologies (e.g. 2G, 3G, 4G, etc.). The multiple radio access technologies in mobile devices cause a high energy drain on the mobile devices, even while idle.

There is thus a need for addressing these and/or other issues associated with the prior art.

SUMMARY

A system, method, and computer program product are provided for intelligent radio state switching for geographically fixed access points. In use, a location associated with a mobile device is determined, using minimal energy drain on a battery of the mobile device. Additionally, it is determined whether the location is associated with a known desired geographical area for accessing at least one communication network. Further, at least one transceiver of the mobile device is turned on for accessing the at least one communication network when it is determined that the location is associated with the known desired geographical area.

DETAILED DESCRIPTION

Figure 1:
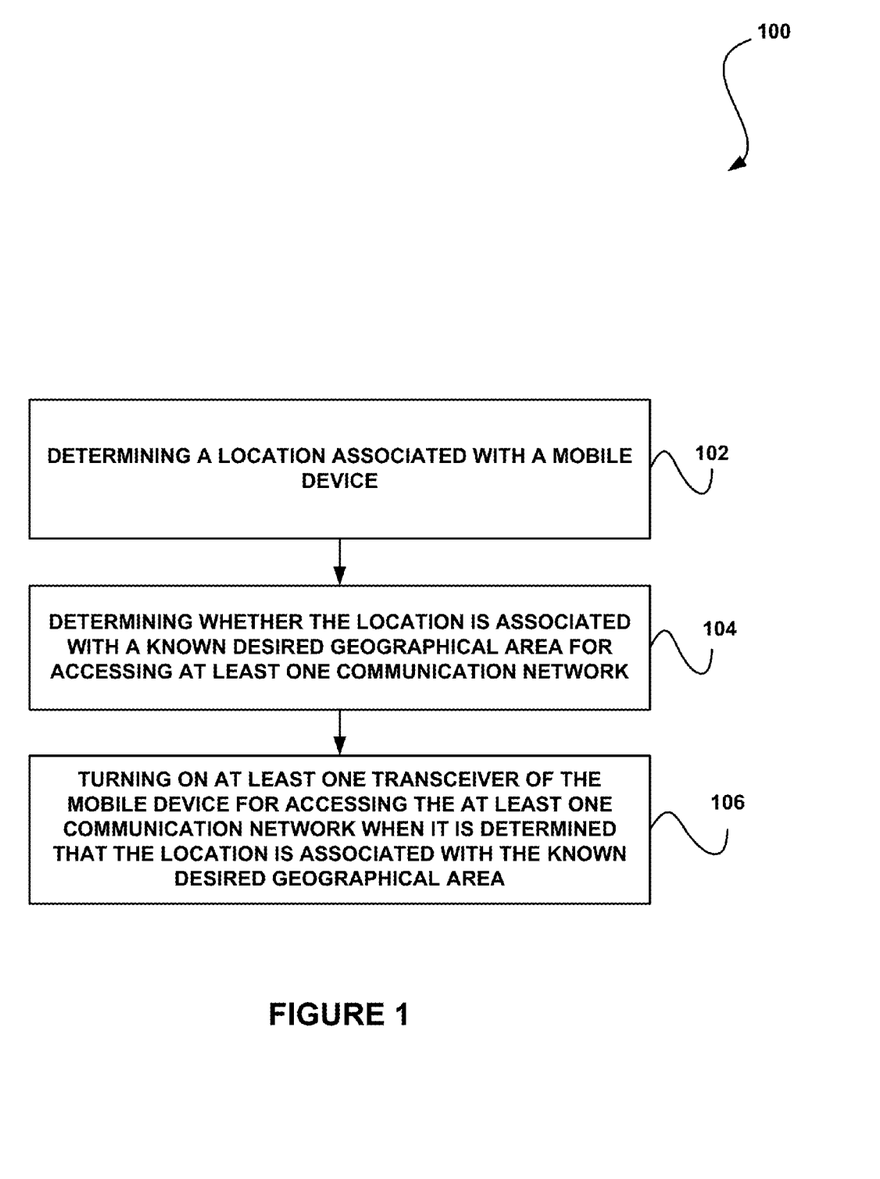
FIG. 1 illustrates a method for intelligent radio state switching for geographically fixed access points, in accordance with one embodiment.

FIG. 1 illustrates a method 100 for intelligent radio state switching for geographically fixed access points, in accordance with one embodiment.

As shown, a location associated with a mobile device is determined. See operation 102. The location is determined using minimal energy drain on a battery of the mobile device. The mobile device may include any type of device, such as a mobile phone, a computer (e.g. a notebook computer, a tablet computer, etc.), a media device, and/or any other type of mobile device.

The location may be determined in a variety of ways. For example, in one embodiment, the location may be determined utilizing location information obtained by a Cell Identifier. In this case, the Cell Identifier may be determined utilizing a subscriber identity module (SIM) of the mobile device or a SIM-less technology associated with the mobile device (i.e. a device without a SIM, etc.).

In another embodiment, the location may be determined utilizing global positioning system (GPS) information. In this case, the GPS information may be determined utilizing GPS functionality of the mobile device. It should be noted that, the mobile device does not need to keep an associated GPS receiver "ON" all of the time. The mobile device may use a combination of Cell-IDs and a GPS technique to turn on GPS measurements only when the mobile device is in known Cell-ID locations (e.g. where the services of a particular access point have been used in the past, etc.).

It should be noted that GPS may refer to any present and future geographical positioning system capable of facilitating geographical positioning in various countries, such as geographical positioning systems provided by countries including the United States (GPS), Russia (GLONASS), the European Union (GNSS), India (IRNSS), India (NAVIC), and China (BEIDOU), etc. GPS may also refer to Assisted-GPS (A-GPS), and Assisted-GLONASS (A-GLONASS), etc.

In another embodiment, the location may be determined utilizing network assisted location information. The network assisted location information may include any location information provided by the network.

Of course, in various embodiments, the location may be determined utilizing any combination of techniques.

Additionally, it is determined whether the location is associated with a known desired geographical area for accessing at least one communication network. See operation 104.

Further, at least one transceiver of the mobile device is turned on for accessing the at least one communication network when it is determined that the location is associated with the known desired geographical area. See operation 106.

The known desired geographical area may include any area, building, city, and/or any other type of geographical area. Additionally, the known desired geographical area may be associated with one or more access points. Moreover, the known desired geographical area may be associated with any location where the mobile device has previously accessed the communication network, or otherwise is familiar with the communication network.

For example, the known desired geographical area for accessing the communication network may be determined based on the mobile device accessing the communication network for a first time from a first location (i.e. on a prior occasion). In this case, the known desired geographical area may be stored in memory of the mobile device.

Further, the mobile device may access the memory to determine whether a current location of the mobile device is within the desired geographical area. In this case, the transceiver of the mobile device (and, in one embodiment, associated infrastructure, etc.) may be turned on for accessing the communication network if it is determined that the current location of the mobile device is within the desired geographical area.

Still yet, in one embodiment, the method 100 may include determining whether the mobile device has left the known desired geographical area. The determination of whether the mobile device has left the known desired geographical area is based on the mobile device detecting that the mobile device has left a service area associated with the known desired geographical area. In this case, the relevant transceiver (e.g. and associated infrastructure, etc.) of the mobile device may be turned off when it is determined that the mobile device has left the known desired geographical area for accessing the communication network.

The communication network may include any type of communication network. For example, in various embodiments, the communication network may include a Global System for Mobile Communications (GSM) network, an Enhanced Data rates for GSM Evolution (EDGE) network, a 3GPP UMTS network, a 3GPP based standardized access network, a 3GPP2 based access network, a Wi-Fi network, a Wi-Max network, a Wireless-USB network, a Bluetooth network, a LiFi network, a network associated with another radio technology, and/or any other type of network.

Moreover, the transceiver and associated functionality of the mobile device that is turned on and off may be associated with any corresponding communication network. Turning on the transceiver refers to putting the transceiver (e.g. and associated infrastructure, functionality, etc.) in an operational state (e.g. from a non-functional state, etc.). Turning off the transceiver may refer to powering off the transceiver and/or putting the transceiver and associated infrastructure in a mode that utilizes less energy than a "turned on" state.

Thus, the method 100 provides an effective and energy efficient automated radio management technique to address energy drain on the mobile devices. The method 100 may be implemented to significantly reduce the energy consumption of the mobile device.

Furthermore, in one embodiment, the method 100 may be implemented by a mobile device to make intelligent automated decisions to turn on required infrastructure for enabling communication using preferred technology (i.e. relevant transceivers, etc.). Additionally, because the target radio/transceiver is switched on only at desired locations, chances of hacking by fraudulent access points are reduced drastically on that radio technology.

The interconnection between the radio/transceiver based devices (i.e. Internet of Things [IOT]) can broadly be divided into two categories: 1) event triggered leading to one of the devices calling other devices; and 2) event triggered outside the scope of communicating devices, where devices simultaneously try (commanded by third party) to start communication.

The method 100 generally applies to the first category where the triggering event is the desired (learned) location. Utilizing the method 100, effective use of location information from multiple sources is used to trigger the radio of one particular technology. Thus, a transceiver may be switched on only when required, thus offering efficiency in connecting and saving on the battery drain of the mobile device.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
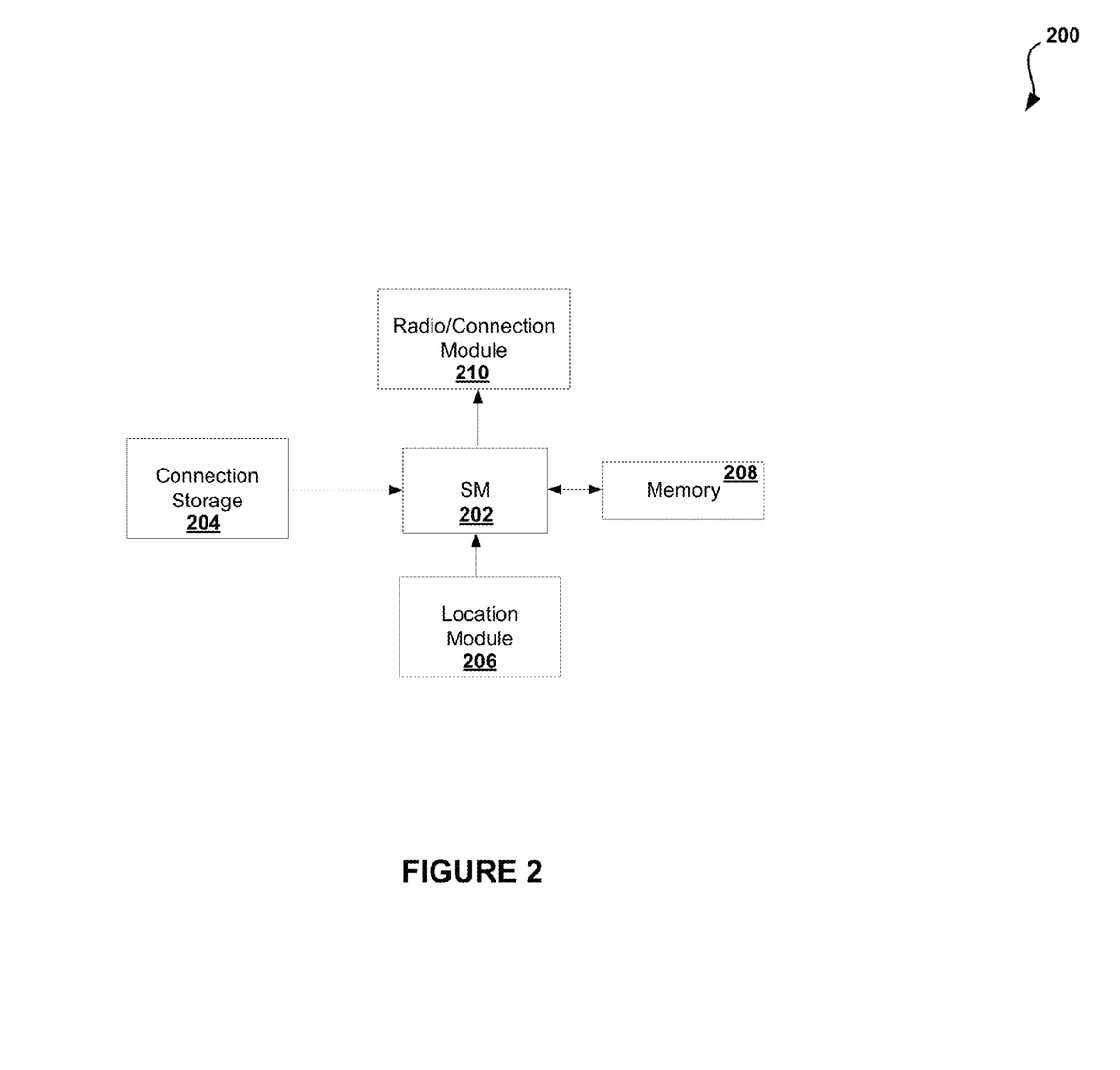
FIG. 2 illustrates a system diagram for intelligent radio state switching for geographically fixed access points, in accordance with one embodiment.

FIG. 2 illustrates a system diagram 200 of a mobile device for intelligent radio state switching for geographically fixed access points, in accordance with one embodiment. As an option, the system diagram 200 may be implemented in the context of the details of the previous Figure. Of course, however, the system diagram 200 may be implemented in the context of any desired environment. Further, the aforementioned definitions may equally apply to the description below.

Although the system flow diagram 200 will be described in the context of Wi-Fi radio access, the techniques described herein may be utilized to support any current and future radio technologies. These radio technologies include cellular technologies such as GSM, EDGE, 3GPP UMTS, LTE (for cell broadcast/location-information,) and Wi-Fi, WiMAX, Wireless-USB, and Bluetooth, etc. (e.g. as target radio technology being managed by Intelligent Mobile Device Connection Management) and LiFi based technologies.

Moreover, the location information can be obtained from one or more of Cell-IDs (e.g. using a SIM/USIM module of the mobile device, etc.), GPS information (e.g. using a local GPS-client of the mobile device), and/or network assisted location information.

The location information will enable the device's radio/transceiver of target technology (i.e. technology associated with the particular network) to be turned on by entering a specific geographical area (e.g. Home/Office, etc.) and remain switched-off otherwise. Software with associated common memory of the mobile device may be used to store the mapping between location information and technology information, along with additional connection information (e.g. if additional connection information is present).

For example in the case of Wi-Fi technology, this software may store mappings such as Wi-Fi SSID←→Location information (e.g. associated Cell-IDs, coordinates with accuracy in other cases, etc.).

With reference to FIG. 2, in operation, a software module 202 may be activated in an intelligent connection management mode of a mobile device. The software module 202 may extract connection related information from a connection storage 204 and retrieve location information from a location module 206. The modules 202-206 may be associated with (and/or composed of, etc.) a variety of software and/or hardware.

On first connection, the software module 202 learns the location information where the radio/transceiver for the connection device (e.g. an access point) is available and stores this information in memory 208 (e.g. non-volatile memory). On subsequent revisit of the mobile device to the same area, the software module 202 triggers the radio/transceiver by issuing a "radio/transceiver on command" to a radio/connection module 210. When the device is no longer within the coverage area, the software module 202 turns off the radio/transceiver.

If the software module 202 discovers a new area where the radio/Lifi signals are available, the software module 202 updates the related association in the memory 208. Thus, the coverage area associated with a network may change and/or be updated. In various embodiments, the connection storage 204 and the radio/connection module 210 can be single or separate units.

In one embodiment, a combination of Cell-ID and GPS information may be used to determine a location in a highly efficient manner. For example, location area code (LAC) and sector-ID may be utilized to determine a location of the mobile device, if such information is available. Cell-IDs are broadcasted, so there is only minimal extra effort in receiving that information by the mobile device.

The software module 202 may update Cell-ID (CID) information the first time and whenever a new Cell-ID is available within an access point (AP) service area. Similarly, geo-coordinates may be monitored and updated when the mobile device is within a service area of the access point. Related technology radios/transceiver may be switched off after a threshold is reached outside service area of the access point.

When a transceiver is off (i.e. switched off), the software module 202 may monitor broadcasted Cell-IDs. If a match is found, the software module 202 may turn on monitoring of geo-coordinates using GPS (or some other location determination functionality). If coordinates (e.g. after taking into account the location precision, e.g., dx, dy, dz) falls within envelop of stored geo-coordinates, the radio/transceiver is turned on and a known connection procedure is initiated for the matched access point. In particular, for Wi-Fi, an access point may be identified by an SSID.

In one embodiment, the related technology radios/transceiver may also behave based on instructions from a cellular network, after a threshold is reached outside the service area of the access point (e.g. for Wi-Fi-offload, etc.). The mobile device may also choose to connect to a designated access point, when it is within an associated service area.

The system 200 may be implemented without receiving any location information from an access point or access point location-server. The system 200 learns and approximates this information. The approximation is more effective as opposed to getting it from an access point.

Further, the system 200 does not need to keep a GPS receiver "ON" all of the time. The system 200 may use a combination of Cell-ID and a GPS method to turn on GPS measurements only when in known Cell-ID locations, where the services of a particular access point have been used in the past. Moreover, the system 200 may first use a location determination technique that is less precise, and subsequently move to a more precise location determination technique. For example, the system 200 may first use Cell-Ids to determine location (i.e. if in a known geographical location, etc.), switch on a GPS receiver and use GPS to determine the location, and then turn on a Wi-Fi radio (i.e. if in a known geographical location, etc.) and use an indoor access point to determine the location more precisely.

Figure 3:
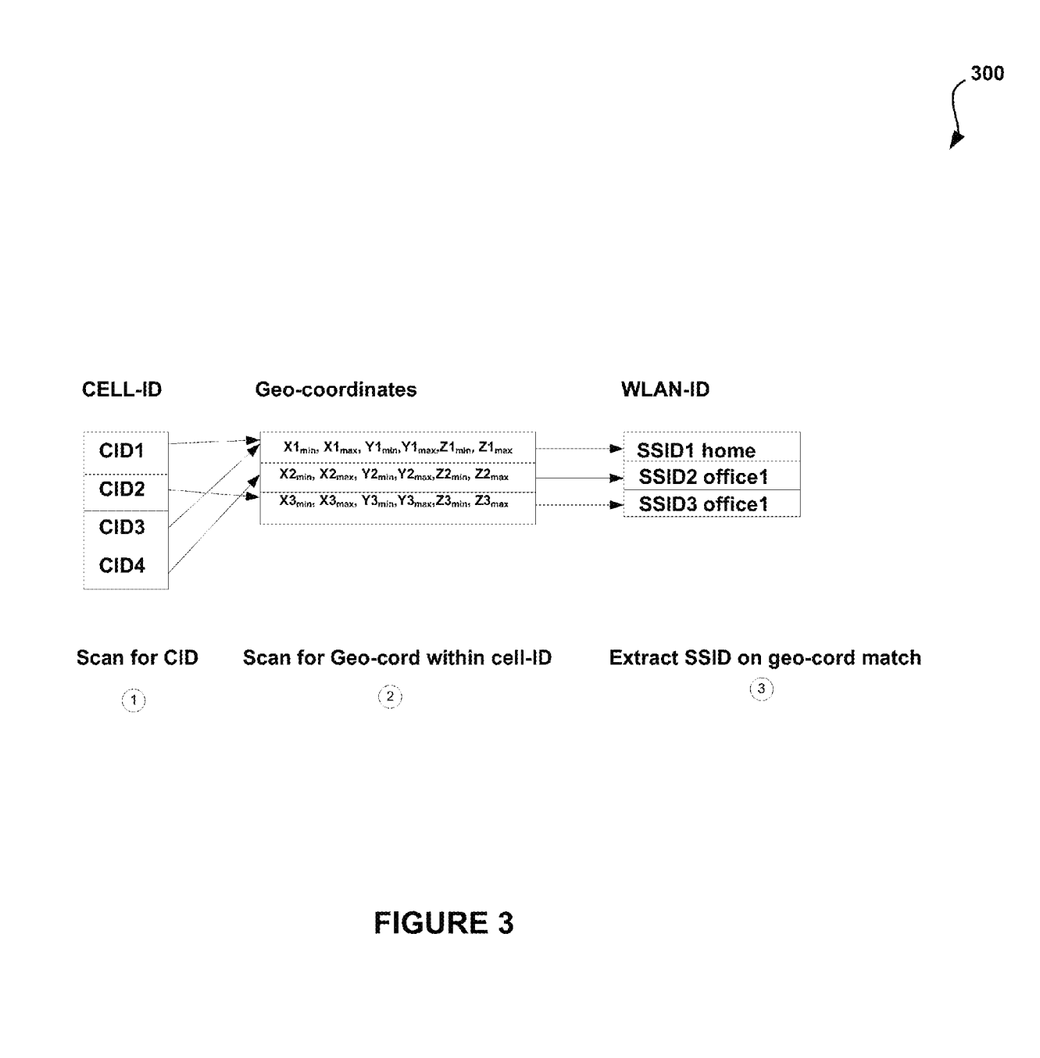
FIG. 3 illustrates a flow diagram for intelligent radio state switching for geographically fixed access points, in accordance with one embodiment.

In one embodiment, access point information associated with a particular technology may also be stored in the memory 208, for example, as shown in FIG. 3.

FIG. 3 illustrates a flow diagram 300 for intelligent radio state switching for geographically fixed access points, in accordance with one embodiment. As an option, the flow diagram 300 may be implemented in the context of the details of the previous Figures. Of course, however, the flow diagram 300 may be implemented in the context of any desired environment. Further, the aforementioned definitions may equally apply to the description below.

As shown, a mobile device may scan for a Cell-ID and all available Cell-IDs may be stored. See step 1. Geo-coordinates may then be determined and associated with the Cell-IDs. See step 2. SSIDs may then be extracted on a geo-coordinate match. See step 3. Thus, access point information may be stored to identify the access point.

Figure 4:
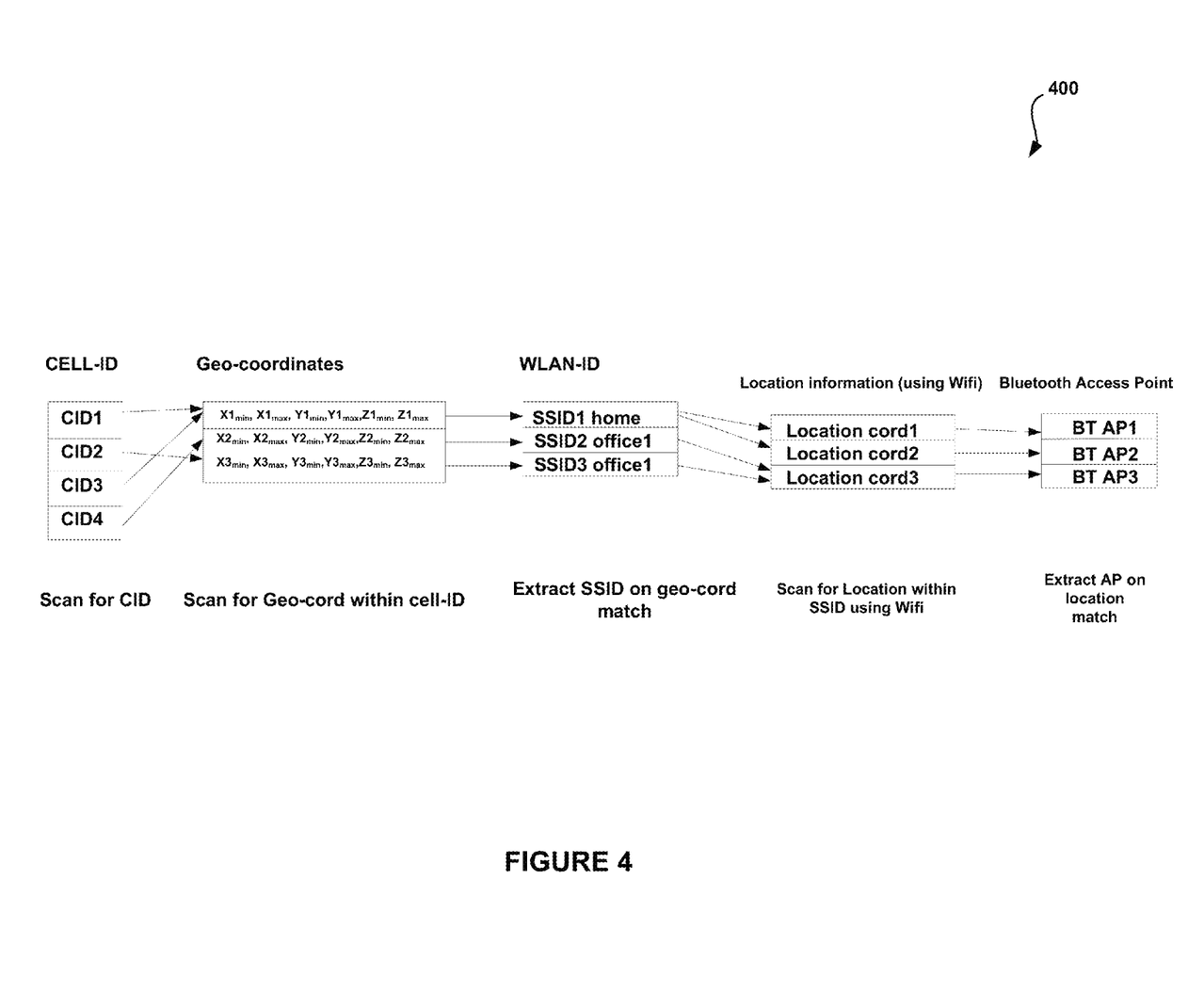
FIG. 4 illustrates a flow diagram for intelligent radio state switching for geographically fixed access points, in accordance with one embodiment.

Further, such technique may be employed for further efficiency using a hierarchal structure with the first scanning being the least granular location based technology and the last scanning being the most granular. FIG. 4 shows one example of such scenario.

FIG. 4 illustrates a flow diagram 400 for intelligent radio state switching for geographically fixed access points, in accordance with one embodiment. As an option, the flow diagram 400 may be implemented in the context of the details of the previous Figures. Of course, however, the flow diagram 400 may be implemented in the context of any desired environment. Further, the aforementioned definitions may equally apply to the description below.

As shown in FIG. 4, Bluetooth radio is turned on based on the relative location of a Bluetooth access point within a Wi-Fi coverage area. This location information is retrieved from a more efficient Wi-Fi location determining module instead of GPS (keeping in mind that an indoors Wi-Fi location is more precise than a GPS location).

Figure 5:
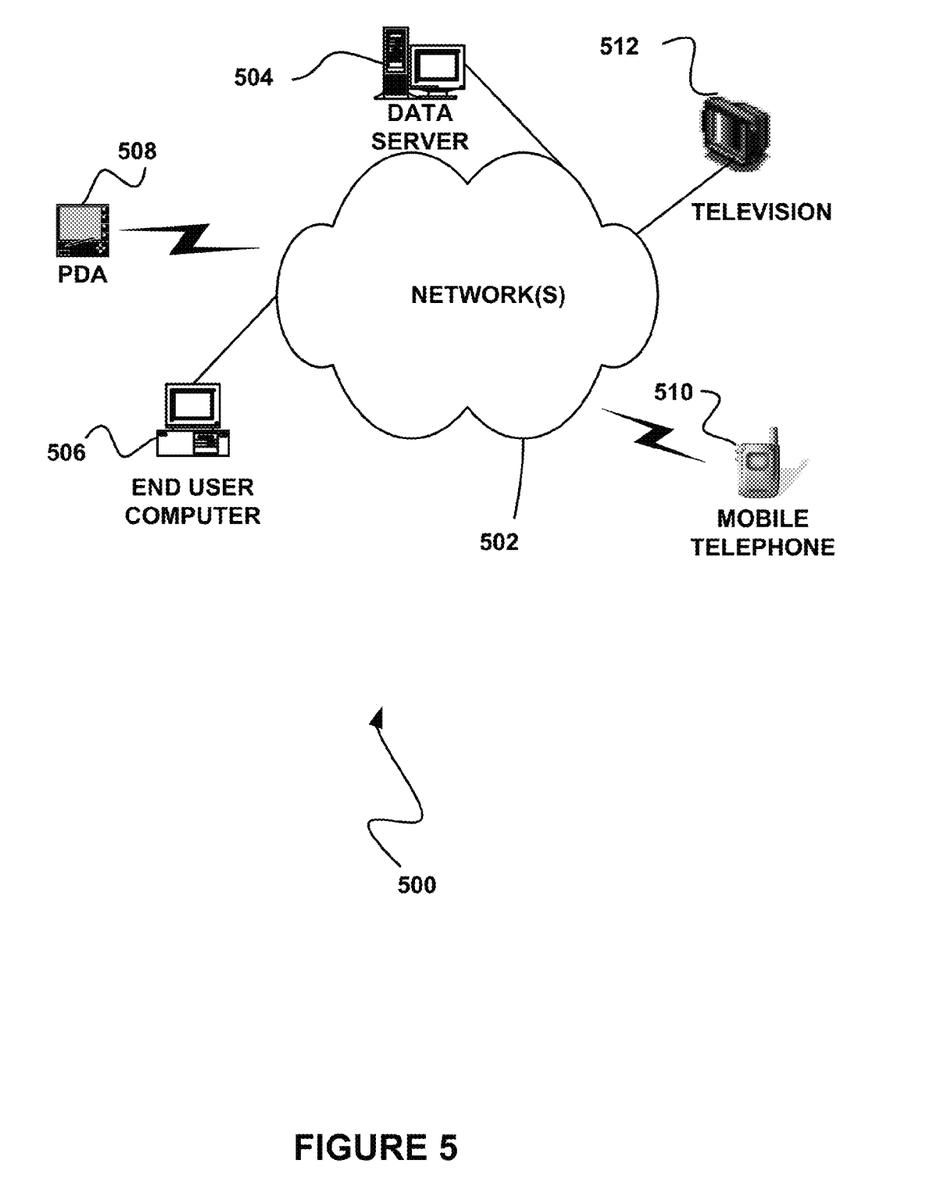
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
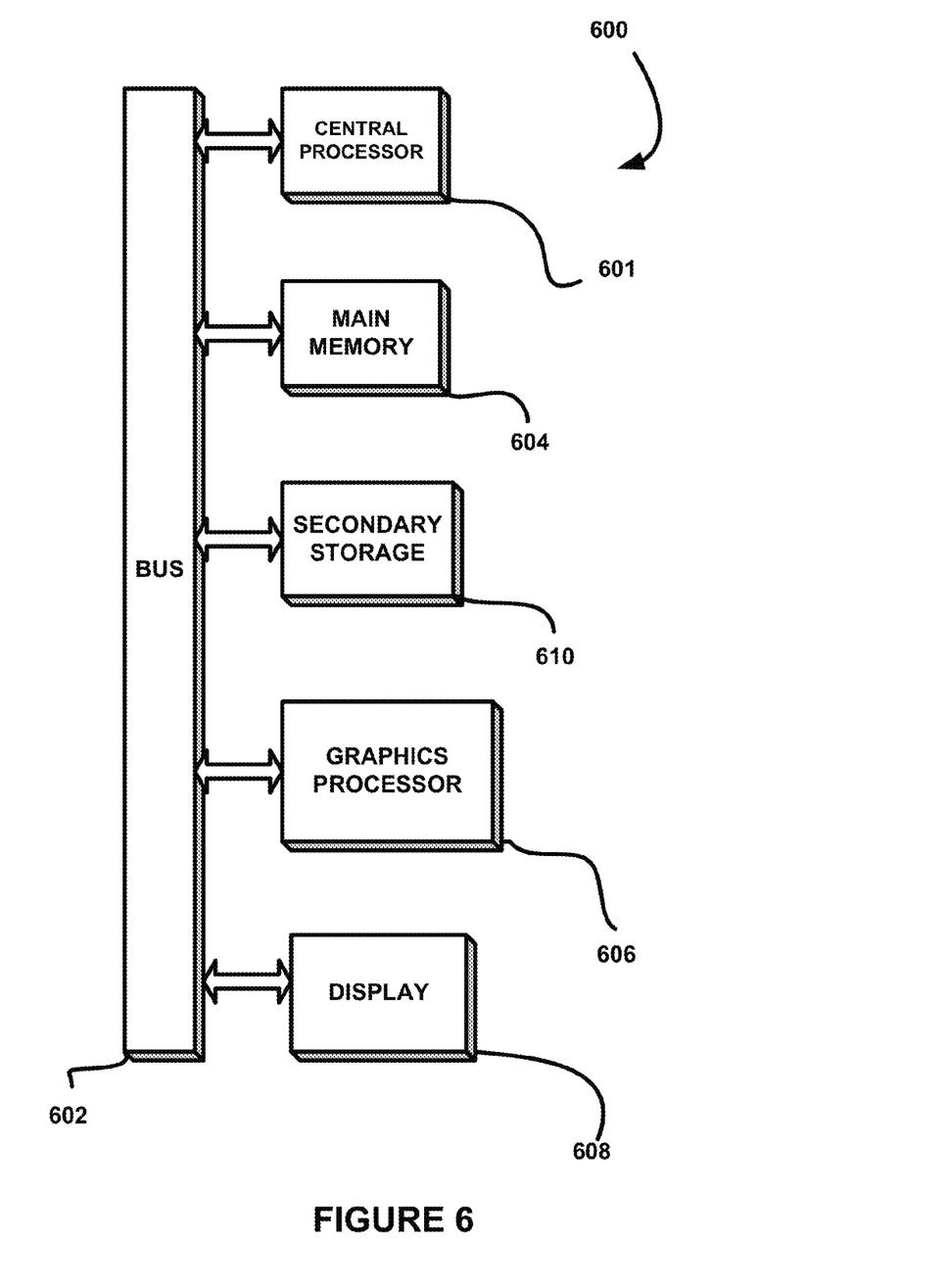
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising:
   computer code for storing, in memory of a mobile device, a mapping between a network technology and location identifiers, the location identifiers being:
   (a) one or more cell identifiers previously determined to be available within a service area of at least one access point associated with the network technology, and (b) one or more global positioning (GPS) coordinates previously determined to be within the service area of the at least one access point associated with the network technology;

computer code for determining, by the mobile device, that a location of the mobile device is within the service area of the at least one access point associated with the network technology, by:

monitoring, by the mobile device, cell identifiers broadcasted to the mobile device, determining, by the mobile device from the monitoring of the cell identifiers, that one of the cell identifiers broadcasted to the mobile device matches one of the one or more cell identifiers stored in the memory of the mobile device, responsive to determining that one of the cell identifiers broadcasted to the mobile device matches one of the one or more cell identifiers stored in the memory of the mobile device, initiating monitoring, by the mobile device, of GPS coordinates measured for the mobile device, determining, by the mobile device from the monitoring of the GPS coordinates, when a current one of the GPS coordinates measured for the mobile device matches one of the one or more GPS coordinates stored in the memory of the mobile device, responsive to determining current one of the GPS coordinates measured for the mobile device matches one of the one or more GPS coordinates stored in the memory of the mobile device, determining, by the mobile device, that the location of the mobile device is within the service area of the at least one access point associated with the network technology; and computer code, responsive to determining that the location of the mobile device is within the service area of the at least one access point associated with the network technology, for turning on at least one transceiver of the mobile device that is specific to the network technology for accessing one of the at least one access point associated with the network technology.

2. The computer program product of claim 1, further comprising computer code for determining that the mobile device has left the service area of the at least one access point associated with the network technology.

3. The computer program product of claim 2, further comprising computer code for turning off the at least one transceiver of the mobile device when it is determined that the mobile device has left the service area of the at least one access point associated with the network technology.

4. The computer program product of claim 1, wherein the computer program product is operable such that the network technology is associated with a GSM network.

5. The computer program product of claim 1, wherein the computer program product is operable such that the network technology is associated with an EDGE network.

6. The computer program product of claim 1, wherein the computer program product is operable such that the network technology is associated with one of: a 3GPP based standardized access network; a 3GPP2 based access network; and a LiFi network.

7. The computer program product of claim 1, wherein the computer program product is operable such that the network technology is associated with a WiFi network.

8. The computer program product of claim 1, wherein the computer program product is operable such that the network technology is associated with a WiMax network.

9. The computer program product of claim 1, wherein the computer program product is operable such that the network technology is associated with a Wireless-USB network.

10. The computer program product of claim 1, wherein the computer program product is operable such that the network technology is associated with at least one of a Bluetooth network or a network associated with a radio technology.

11. The computer program product of claim 1, wherein the computer program product is operable such that the mapping is determined based on the mobile device accessing the at least one access point associated with the network technology for a first time.

12. The computer program product of claim 1, further comprising:

computer code for discovering, by the mobile device, a change to the service area of the at least one access point associated with the network technology;

computer code for updating, by the mobile device, the mapping stored in memory to reflect the change.

13. The computer program product of claim 12, wherein the change is a new area that is within the service area of the at least one access point associated with the network technology, and wherein the mapping stored in memory is updated to include the new area.

14. The computer program product of claim 13, wherein the new area is indicated by at least one of a new cell identifier and new GPS coordinates.

15. The computer program product of claim 1, further comprising computer code for:

after the at least one transceiver of the mobile device that is specific to the network technology is turned out, initiating, by the mobile device, a known connection procedure for the at least one access point associated with the network technology;

wherein the memory stores additional connection information associated with the network technology.

16. A method, comprising:

storing, in memory of a mobile device, a mapping between a network technology and location identifiers, the location identifiers being:

(a) one or more cell identifiers previously determined to be available within a service area of at least one access point associated with the network technology, and (b) one or more global positioning (GPS) coordinates previously determined to be within the service area of the at least one access point associated with the network technology;

determining, by the mobile device, that a location of the mobile device is within the service area of the at least one access point associated with the network technology, by:

monitoring, by the mobile device, cell identifiers broadcasted to the mobile device, determining, by the mobile device from the monitoring of the cell identifiers, that one of the cell identifiers broadcasted to the mobile device matches one of the one or more cell identifiers stored in the memory of the mobile device, responsive to determining that one of the cell identifiers broadcasted to the mobile device matches one of the one or more cell identifiers stored in the memory of the mobile device, initiating monitoring, by the mobile device, of GPS coordinates measured for the mobile device, determining, by the mobile device from the monitoring of the GPS coordinates, when a current one of the GPS coordinates measured for the mobile device matches one of the one or more GPS coordinates stored in the memory of the mobile device, responsive to determining current one of the GPS coordinates measured for the mobile device matches one of the one or more GPS coordinates stored in the memory of the mobile device, determining, by the mobile device, that the location of the mobile device is within the service area of the at least one access point associated with the network technology; and responsive to determining that the location of the mobile device is within the service area of the at least one access point associated with the network technology, turning on at least one transceiver of the mobile device that is specific to the network technology for accessing one of the at least one access point associated with the network technology.

17. A mobile device comprising:

a memory system; and one or more processing cores coupled to the memory system and that are each configured to:

store, in the memory system, a mapping between a network technology and location identifiers, the location identifiers being:

(a) one or more cell identifiers previously determined to be available within a service area of at least one access point associated with the network technology, and (b) one or more global positioning (GPS) coordinates previously determined to be within the service area of the at least one access point associated with the network technology;

determine that a location of the mobile device is within the service area of the at least one access point associated with the network technology, by:

monitoring cell identifiers broadcasted to the mobile device, determining, from the monitoring of the cell identifiers, that one of the cell identifiers broadcasted to the mobile device matches one of the one or more cell identifiers stored in the memory of the mobile device, responsive to determining that one of the cell identifiers broadcasted to the mobile device matches one of the one or more cell identifiers stored in the memory of the mobile device, initiating monitoring of GPS coordinates measured for the mobile device, determining, from the monitoring of the GPS coordinates, when a current one of the GPS coordinates measured for the mobile device matches one of the one or more GPS coordinates stored in the memory of the mobile device, responsive to determining current one of the GPS coordinates measured for the mobile device matches one of the one or more GPS coordinates stored in the memory of the mobile device, determining that the location of the mobile device is within the service area of the at least one access point associated with the network technology; and responsive to determining that the location of the mobile device is within the service area of the at least one access point associated with the network technology, turn on at least one transceiver of the mobile device that is specific to the network technology for accessing one of the at least one access point associated with the network technology.

* * * * *